United States Patent [19]
Palmaer

[11] 3,826,150
[45] July 30, 1974

[54] LINK CONFIGURATION FOR DISTRIBUTION OF TRANSVERSE LOADS ON DRIVE AND DRAG CHAIN

[75] Inventor: Karl V. Palmaer, Carmichael, Calif.

[73] Assignee: KVP Company, Inc., Sacramento, Calif.

[22] Filed: May 8, 1972

[21] Appl. No.: 251,476

[52] U.S. Cl............................................ 74/250 R
[51] Int. Cl........................................... F16g 13/07
[58] Field of Search.. 74/245 R, 249, 250 R, 250 C, 74/251 R, 245 C

[56] References Cited
UNITED STATES PATENTS

| 286,338 | 10/1883 | Shields | 74/245 R |
| 743,070 | 8/1903 | Garland | 74/249 |
| 1,059,297 | 11/1910 | Howe | 74/249 |
| 1,804,701 | 5/1929 | Majonnier | 74/245 R |
| 2,412,364 | 8/1944 | Sivyer | 74/250 R |
| 3,107,777 | 2/1959 | Steorts | 74/251 R |

Primary Examiner—Samuel Scott
Assistant Examiner—Allan Russell Burke
Attorney, Agent, or Firm—Phillips, Moore, Weissenberger, Lempio & Strabala

[57] ABSTRACT

Drive and drag chain links of novel configuration are disclosed. Specific link configurations including a recess or aperture having shaped side walls to enable distribution of transverse loads and reduce sprocket tooth insertion losses are described. A link configuration for providing bow chain action is disclosed.

4 Claims, 8 Drawing Figures

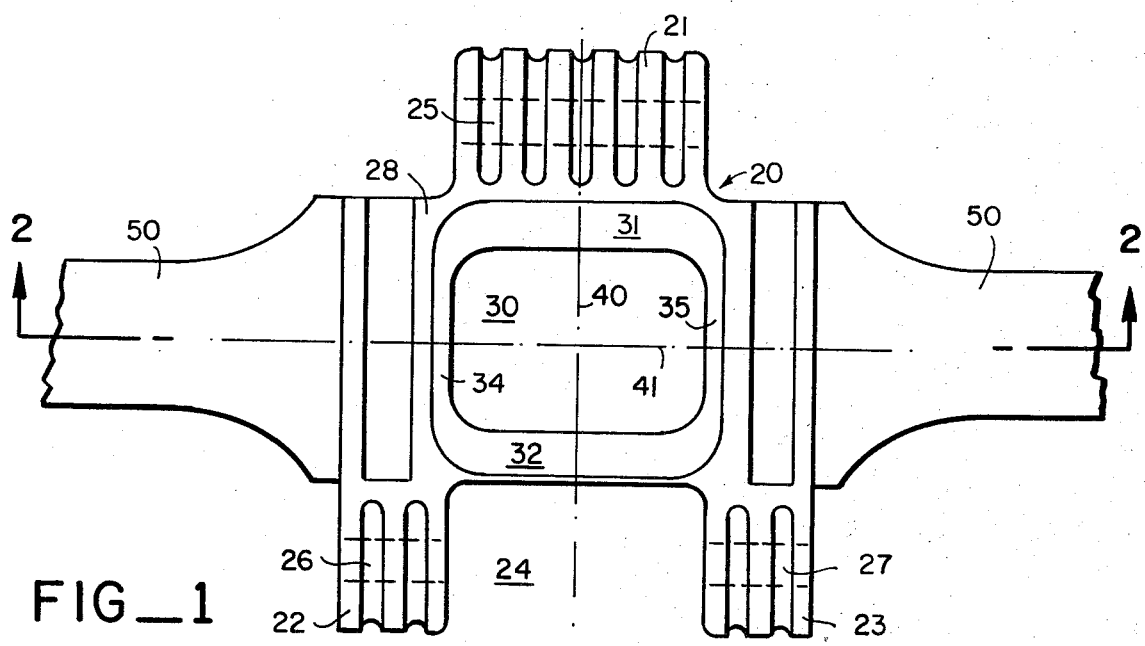
FIG_1
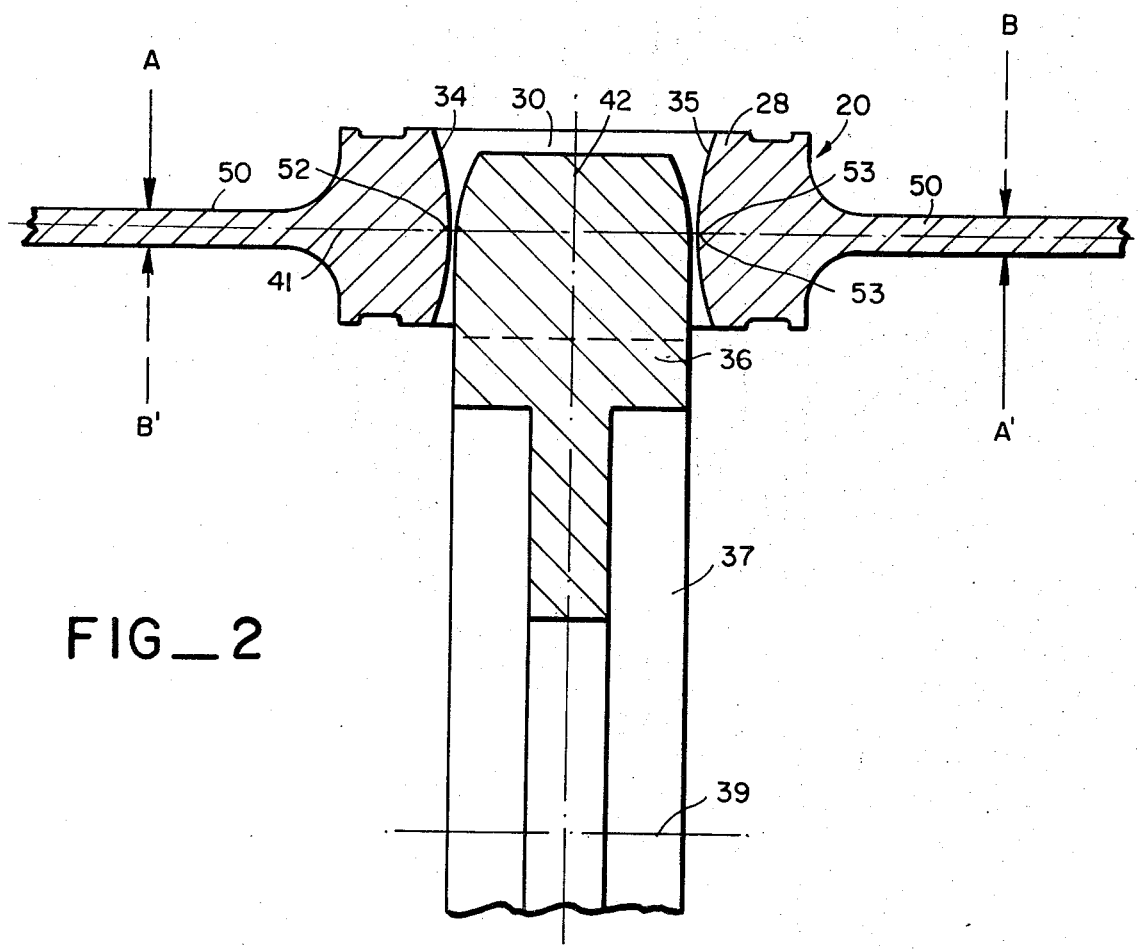
FIG_2

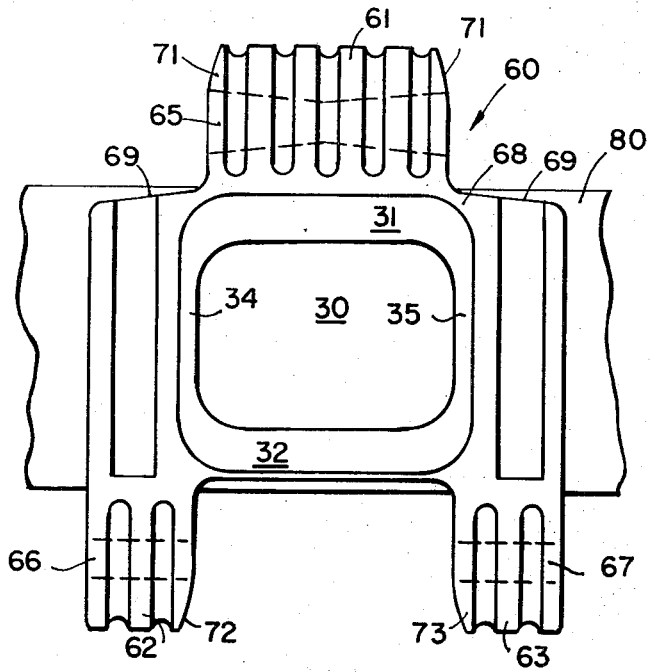
FIG_3
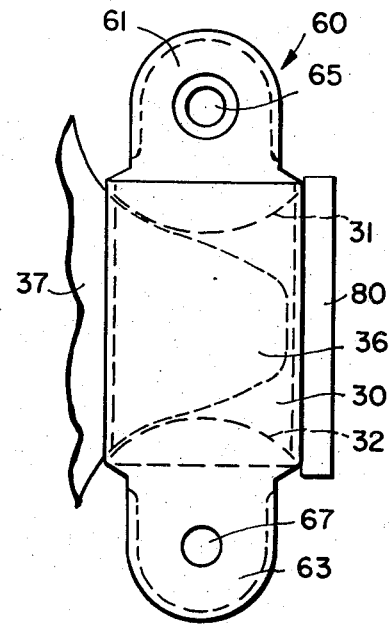
FIG_4
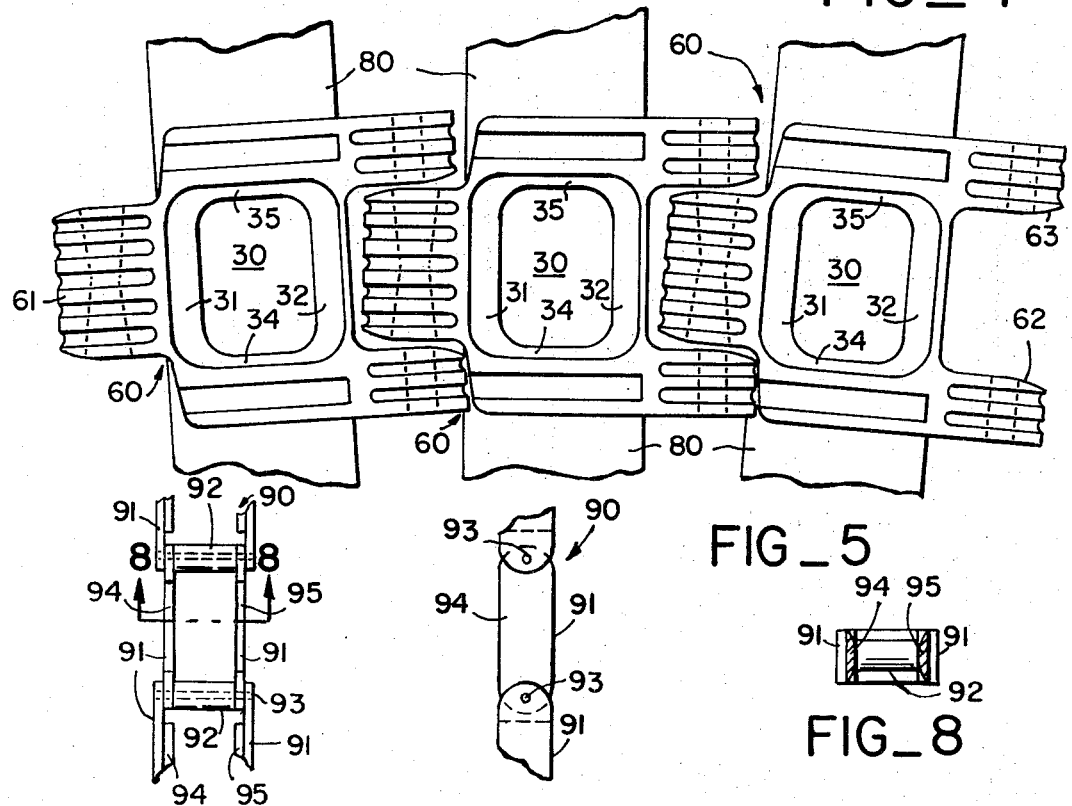
FIG_5
FIG_6  FIG_7  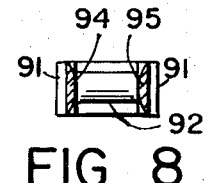 FIG_8

LINK CONFIGURATION FOR DISTRIBUTION OF TRANSVERSE LOADS ON DRIVE AND DRAG CHAIN

BACKGROUND OF THE INVENTION

This invention relates to links for use in chains which co-operate with drive and idling sprocket wheels to carry loads or transmit power and more particularly to such a link having a configuration which includes means for the improved distribution of the transverse loads to which a chain formed of links of such configuration may be subjected.

Chains for carrying loads or transmitting power have conventionally comprised a plurality of links each made of a plurality of parts including side members and cross members arranged to define an opening for receiving the teeth of a driving or driven sprocket wheel. The links are joined together by cross pins or pintles so that they may pivot with respect to each other. The cross members may be nothing more than the pintles, but cylindrical rollers may be mounted between the side members about the pintles to protect the pintles from wear and reduce the frictional resistance to the insertion and withdrawal of the sprocket teeth.

In the applicant's prior U.S. Pat. No. 3,641,831, a configuration for the links of a drive chain is disclosed in which the link is a unitary body having projections formed thereon for connecting the links together by means of pintles passing through apertures therein to form a chain. The link body has a central recess formed therein provided with a cylindrical driving surface for engagement with the teeth of a sprocket wheel, which driving surface has its axis coincident with the axis of one of the apertures therein through which a pintle is passed to connect the link into the chain. However, as with other prior art link configurations the side walls of the recess present flat surfaces to the sides of the teeth of the sprocket wheel.

It will be understood that the inner surfaces of the side members or recess side walls of a chain link are spaced from each other to receive the teeth of a sprocket wheel with a certain tolerance in such spacing as required by the particular application for the chain of which the link is a part. Thus, unless a chain and sprocket are perfectly aligned, one or the other of the flat side members or surfaces of each link of the chain will tend to engage a side surface of a tooth of the sprocket wheel upon insertion of such tooth in such link. Such engagement contributes to the frictional resistance inherent in the insertion of such tooth in such link. In addition, such engagement will tend to prevent the sides of the link from tipping up or down with respect to the axis of the sprocket wheel with which it is engaged. This tends to localize transverse stress imposed on the link in use resulting in increased wear and reduced strength.

In order to provide a clear understanding of the teaching of this invention, the axis of a link extending in the direction of motion of the chain of which the link is a part is called herein the "longitudinal axis" of the link. The axis of the link extending through the sides thereof and generally parallel to the axis of a sprocket wheel when engaged therewith is called herein the "lateral axis" of the link. The third axis of the link, perpendicular to the other two and to the axis of a sprocket wheel when engaged therewith is called herein the "transverse axis" of the link.

Applicant's prior U.S. Patent teaches the balancing of the longitudinal stresses (i.e. stresses acting along the longitudinal axis) in a drive chain link. It will be understood that lateral stresses (i.e. stresses acting along the lateral axis) to which a chain link is subjected in both drive chain and drag chain applications are inherently small. However, in both drive chain and drag chain applications the links of the chain are often subjected to large transverse stresses (i.e. stresses acting along the transverse axis) which may result from either impact forces or sustained loads or both.

It is an object of this invention to provide a chain link having a configuration which enables transverse stresses to be more evenly distributed in the body of the link.

It is a further object of this invention to provide a chain link having a configuration which exhibits reduced wear in use when subjected to repeated or continuous transverse stresses.

It is another object of this invention to provide a chain link having a configuration which tends to reduce frictional resistance to the insertion and removal of sprocket teeth therefrom.

It is yet a further object of this invention to provide an improved unitary body link configuration for drag or drive chains providing improved wear and rupture resistance and reduced frictional losses.

SUMMARY OF THE INVENTION

Briefly a chain link in accordance with this invention comprises side members and a cross member attached thereto and extending therebetween to define an opening for receiving the teeth of a sprocket wheel, the cross member being adapted to provide a driving surface for engagement with the driving surface of the teeth of the sprocket wheel and the side members each being provided with a substantially cylindrical convex inner surface within said opening having a radius of curvature approximately the width of the opening for engagement with the side surfaces of the teeth of the sprocket wheel. The chain link may be made as a unitary generally rectangular body having a first projection on one side thereof and second and third projections on the opposite side thereof from said first projection and spaced from each other to receive a projection identical to such first projection.

BRIEF DESCRIPTION OF THE DRAWING

FIG. 1 is a plan view of a link in accordance with one embodiment of this invention;

FIG. 2 is a cross-sectional view taken along line 2—2 of FIG. 1 and including a cross-sectional showing of a portion of a sprocket wheel having a tooth engaged with the link;

FIG. 3 is a plan view of a link in accordance with another embodiment of this invention;

FIG. 4 is a side-view of the link shown in FIG. 3 including a showing in phantom of a portion of a sprocket wheel having a tooth engaged with the link;

FIG. 5 is a plan view of three links in accordance with the embodiment shown in FIG. 3 joined together to form a portion of a chain and illustrating the bow chain action provided thereby;

FIG. 6 is a plan view of a conventional link provided with smoothly convex interior side surfaces in accordance with the teaching of this invention;

FIG. 7 is a side view of the link shown in FIG. 6;

FIG. 8 is a cross-sectional view taken along line 8—8 of FIG. 6.

DESCRIPTION OF THE PREFERRED EMBODIMENT

Referring to FIG. 1 a link in accordance with one embodiment of this invention is shown in plan view. Such link comprises a unitary solid body 20 having a projection 21 formed on one side thereof and a pair of spaced projections 22 and 23 formed on the opposite side thereof. A generally cylindrical aperture 25 extends through the first projection 21 and generally cylindrical apertures 26 and 27 having a common axis parallel to the axis of the aperture 25 extend through the second projection 22 and third projection 23, respectively. The spacing 24 between the pair of projections 22 and 23 and their lengths are such that a projection identical to the projection 21 but on a further link may be received therebetween with the apertures 25, 26 and 27 in coaxial alignment. Thus, a plurality of the links shown in FIG. 1 may be connected together to form a chain by placing the projection 21 on one of such links between the pair of projections 22 and 23 on another link and inserting a cylindrical pin or pintle in the aligned apertures 25, 26 and 27 thereof.

The main portion 28 of the body 20 is provided with a recess 30 for engagement with the teeth of a sprocket wheel. The recess 30 is preferably formed in the main portion 28 of the body 20 such that its center is equally spaced from the axis of the aperture 25 and from the common axis of the apertures 26 and 27. In addition, the configuration of the recess 30 may be such as to provide cylindrical driving surfaces 31 and 32 having their axes coincident with the axis of aperture 25 and the common axis of apertures 26 and 27, respectively. The purpose of cylindrical driving surfaces 31 and 32 is to reduce the wear resulting from engagement with the driving surfaces of the teeth of a sprocket wheel as well as to reduce resistance to the insertion and removal of such teeth from the recess 30.

As shown in FIGS. 1 and 2 the recess 30 passes completely through the main portion 28 of the body 20 in a direction normal to the axes of the apertures 25, 26 and 27. However, it should be understood that it is not necessary for the recess 30 to pass completely through the body 20, it is only necessary that the recess 30 extend into the body for a sufficient distance in a direction normal to the axes of the apertures 25, 26 and 27 to provide for efficient engagement with the teeth of a sprocket wheel. Thus, the link shown in FIGS. 1 and 2 is adapted to drive or be driven on either direction along the longitudinal axis thereof, identified in FIG. 1 by the reference numeral 40, by engagement with the teeth of a sprocket wheel.

As shown in FIGS. 1 and 2 the link body 20 may be provided with lateral extensions 50. Such lateral extensions 50 may be attached to or embedded in a belt, pan, or other appropriate load bearing means for conveying articles or transmitting power from the chain to an appropriate surface. The extensions 50 project along the lateral axis of the link body 20 identified in FIGS. 1 and 2 by the reference numeral 41.

Referring to FIG. 2 it will be seen that in accordance with the teaching of this invention the sides of the recess 30 extending between the driving surfaces 31 and 32 are provided with convex surfaces 34 and 35 which are substantially cylindrical along the transverse axis of the link 20 identified in FIG. 2 by reference numeral 42. The side surfaces 34 and 35 are spaced from each other along the lateral axis of the link body 20 a sufficient distance to receive therebetween a tooth 36 of a sprocket wheel 37 with a small tolerance and have a radius of curvature approximating such spacing. Under normal conditions the tooth 36 of the sprocket wheel 37 will be received in the aperture 30 of the link body 20 with the lateral axis 41 of the link body 20 parallel to the axis 39 of the sprocket wheel 37 and (as best shown in FIG. 4) with the driving surfaces 31 and 32 of the recess 30 in engagement with the driving surfaces of the tooth 36 of the sprocket wheel 37. If the chain of which the link body 20 is a part is perfectly aligned with the sprocket wheel 37, the sides of the tooth 36 will be equally spaced from the side surfaces 34 and 35 of the recess 30 as shown in FIG. 2. If there is a misalignment between the chain of which the link body 20 is a part and the sprocket wheel 37 then the smoothly curved side surfaces on the free end of the tooth 36 will cooperate with the smoothly curved side surfaces 34 and 35 of the recess 30 to guide the tooth into the recess 30. It is of course customary in the prior art to provide the free ends of the teeth of sprocket wheels with curved side surfaces at the free ends thereof as shown in FIG. 2. However, in the prior art the side surfaces of the chain link recess are usually merely flat surfaces extending perpendicularly to the lateral axis of such links. It has been found that under the dynamic conditions which exist during the insertion and removal of the teeth of sprocket wheels into the links of a chain, the provision of curved surfaces 34 and 35 in accordance with this invention as shown in FIG. 2 will further reduce the power lost in overcoming frictional resistance to the insertion and withdrawal of sprocket teeth in the links.

In addition, the provision of the smoothly curved convex side surfaces 34 and 35 enables stresses acting along the transverse axis 42 of the link to be distributed throughout the link 20. Thus, assuming a load or impact on the left hand extension 50 of the link 20, the transverse component of such load or impact represented by the arrow labeled A will result in transverse stresses in the link tending to cause the lateral axis 41 of the link to tip out of parallelism with the axis 39 of the sprocket wheel 37. In chain links of the prior art, the flat side surfaces of the recess 30 in the link body 20 will engage the flat side surfaces of the tooth 36 of the sprocket wheel 37 thereby preventing such tipping of the lateral axis 41 of the link body. The net result in the prior art was that the transverse stresses produced by the load or impact indicated by the arrow A would be localized at the root or juncture of the extension 50 with the link body 20 and a consequent weakening or fracture at such root or juncture.

According to the teaching of this invention an impact or load having a transverse component represented by the arrow A on the left hand extension 50 of the link body 20 will tend to result in contact between the left hand curved surface 34 of the recess 30 and the associated side surface of the tooth 36 at 52. However, such contact 52 will be a line contact rather than an area contact and the lateral axis 41 of the link body 20 will be free to pivot about such line contact at 52. In other words, application of the force A causes the lower half of the curved surface 34 in FIG. 2 to rock or roll rather than slide against the side of tooth 42 until impingement of the surface 35 against the tooth prevents further tilting of the link. It will be noted that as the tilting of the link progresses under increasing loads, the wear point (i.e. the contact point between the surface 34 and the sprocket tooth) gradually shifts from the center of surface 34 to its lower end. Consequently, the wear of both the link and the tooth is distributed over a comparatively large area as varying loads A are applied to the link. This wear distribution, it will be readily realized, does not occur if the radius of curvature of the surface 34 is very small (as, e.g., in the link of U.S. Pat. No. 286,338 to Shields) or very large (as, e.g., the infinitely large radius of a flat-sided link). It occurs only when the radius of curvature of the surface 34 is generally on the same order of magnitude as the width of the opening.

At the same time, the rolling or rocking action engendered by the surface 34 will prevent the transverse stress A produced by the load or impact from being localized and will instead distribute the stress throughout the link body enabling it to be opposed by the transverse components of loads or impacts such as represented by the dotted line arrow B on the opposite extension 50 of the link body 20. An upwardly acting transverse load or impact on the right hand extension 50 of the link body 20 such as represented by the arrow A' would tend to produce the same effect as described in connection with the arrow A.

A downwardly acting transverse load or impact on the right hand extension 50 as represented by the dotted line arrow B or an upwardly acting transverse load or impact on the left hand extension 50 as represented by the dotted line arrow B' would cause the lateral axis 41 of the link body 20 to pivot about a line contact between the opposite side surface of the tooth and the right hand curved surface 35 at 53. Otherwise, the stress distribution effect would be the same as described in connection with the arrows A and A'. It should be understood that the loads or impacts to which a chain is subject in use may have lateral or longitudinal components in addition to the purely transverse components represented by the letters A, A', B and B'. However, lateral components of such loads and impacts are inherently small since drive or drag chain applications are primarily concerned with longitudinal motion and the handling of longitudinal loads and forces.

Referring to FIGS. 3 and 4 a chain link configuration according to a further embodiment of this invention specifically adapted to accommodate some lateral movement and forces is shown. The embodiment of this invention shown in FIGS. 3 and 4 is a chain link for a so-called table top conveyor application. Thus, instead of the projections 50 shown in FIGS. 1 and 2, the chain link 60 of FIGS. 3 and 4 is provided with a flat plate or table member 80 extending across and attached to the top thereof. The plate 80 may be elongated along the lateral axis of the link 60 and may have a width along the longitudinal axis of the link 60 approaching the pitch thereof.

The body 68 of the link 60 is provided with a recess 30 having driving surfaces 31 and 32 and side surfaces 34 and 35 as described in connection with FIGS. 1 and 2. However, the first projection 61 is provided with smoothly curved convex side surfaces 71 at the free end thereof. Similarly, the free ends of the second 62 and third 63 projections are provided with opposed smoothly curved convex surfaces 72 and 73, respectively.

Coaxial cylindrical apertures 66 and 67 extend through the second 62 and third 63 projections, respectively, as in the embodiment shown in FIGS. 1 and 2. However, the aperture 65 extending through the first projection 61 has an inner surface defining a pair of coaxial truncated right circular cones joined at their apexes in the middle of the aperture 65 at the center of the projection 61. The diameter of the aperture 65 at the joined apexes is substantially the same as the diameter of the apertures 66 and 67.

As described in connection with the embodiment shown in FIGS. 1 and 2, the spacing 64 between the second 62 and third 63 projections and the length thereof is such that a projection identical to the first projection 61 may be received therebetween with the apertures 65, 66 and 67 in coaxial alignment. A pin or pintle (not shown) of suitable diameter to engage the apertures 66 and 67 throughout their entire length may be passed through the aligned apertures and held in place by such engagement. Such a pin or pintle would engage the aperture 65 through the first projection 61 only at the middle thereof, thus enabling the axis of the aperture 65 to pivot with respect to the axis of such pintle or pin. As shown in FIG. 3 the shoulders 69 of the body 68 on opposite sides of the first projection 61 are provided with a surface which slopes or recedes along the longitudinal axis of the link 60.

As best shown in FIG. 5 the above-described link configuration permits the longitudinal axes of a plurality of links connected together into a chain to be misaligned with each other thereby providing bow chain action. The smoothly curved convex surfaces 71, 72 and 73 as well as the configuration of the aperture 65 provide reduced frictional resistance to such bow chain action.

As shown in FIGS. 3 through 5, the smoothly curved convex surfaces, 71, 72, and 73 are cylindrical sections. It will be understood that the radius of such cylindrical sections is not critical but should be proportionate to the size of the chain link. In general, if the radius of such cylindrical sections is either too large or too small then the adverse effects of wear will tend to be more pronounced. It will be understood, however, that such surfaces, 71, 72, and 73 need not be cylindrical sections which appear as arcs of a circle in cross-section but may have any smoothly curved convex shape suitable for their purpose such as one which would appear as an arc of an ellipse in cross-section for example.

According to the preferred embodiment of this invention, the chain link is a unitary body of plastic material providing surfaces having a low coefficient of friction. However, it will be understood that the chain links could be made of some other material such as metal in applications where a lubricant may be used to reduce the coefficient of friction of the surfaces thereof.

Similarly, the teaching of this invention may be applied to chain links which are neither plastic nor made as a unitary body. For example, a conventional chain 90 is shown in FIGS. 6 through 8, which chain consists of a plurality of links made up of side members 91 and cross-members 92 connected together by means of pintles 93 to form the chain. According to the teaching of this invention, the side members 91 of such a chain 90 are provided with smoothly curved convex interior surfaces 94 and 95. Such surfaces 94 and 95 are substantially cylindrical surfaces having their axes parallel to the longitudinal axis of the links of the chain 90 of which they are a part, and having a radius of curvature approximating the spacing between the surfaces. The spacing between the surfaces 94 and 95 must, of course, be sufficient to receive the teeth of the associated sprocket wheel with the required tolerance. Such surfaces may be provided by shaping the side members or by an appropriate increasing in thickness of the side members or by coining or otherwise deforming the side members 91 inwardly to provide the surfaces 94 and 95. However, it would also be possible to provide surfaces 94 and 95 by means of separate members attached to the side members 91.

It will be understood that various features of the link configurations of the above-described embodiments may be used in any combination appropriate to meet the requirements imposed upon the chain to be made of such links. Chains made of links having configurations as taught in this application may be used with or without table tops or projections as disclosed herein and may be applied to tracks for driving vehicles or to conveyors for conveying articles or merely to transmit power from one place to another. Thus, it is believed that those skilled in the art will make obvious modifications in the configuration of the links disclosed herein to suit them for use in chains for a wide variety of applications.

What is claimed is:

1. In combination a sprocket wheel having a plurality of teeth with smoothly curved side surfaces at the free ends thereof and a chain consisting of a plurality of links adapted to engage the teeth of said sprocket wheel for the transmission of power, each of said plurality of links comprising side members and a cross member attached thereto and extending therebetween to define an opening into which said teeth of said sprocket wheel are received in use, said cross member providing a driving surface for engagement with the driving surface of said teeth of said sprocket wheel and said side members each providing a substantially cylindrical convex surface within said opening, said convex surface being normally spaced from said teeth by a small tolerance and having its axis of rotation parallel to the longitudinal axis of said link and having a radius of curvature on the order of magnitude of the width of said opening for engagement with a side surface of said teeth of said sprocket wheel, whereby under transverse loads, said convex shape tends to roll or rock rather than slide on contact with the sprocket teeth, thereby distributing frictional wear of said link and teeth over a substantial area and reducing the friction therebetween.

2. The combination as claimed in claim 1 wherein said side members and said cross members are provided by a unitary generally rectangular body having a generally rectangular opening therethrough, said generally rectangular body having a first projection formed on one side thereof, said projection having a generally cylindrical aperture therethrough with its axis extending transversely of said projection; second and third projections formed on the opposite side of said body from said first projection and spaced from each other to receive a projection identical to said first projection, said second and third projections having generally cylindrical apertures therethrough with a common axis extending transversely of said projections parallel to and adapted to be aligned with said axis of said aperture through said first projection if said first projection were received between said second and third projections.

3. The combination as claimed in claim 2 wherein said driving surface provided by said cross members is cylindrical and has its axis coincident with the axis of said aperture through said first projection and said smoothly curved convex surfaces provided by said side members are cylindrical with their axes perpendicular to said axis of said aperture through said first projection.

4. The combination as claimed in claim 1 wherein laterally extending projections are attached to said side members.

* * * * *